Dec. 1, 1931.  B. LOEFFLER  1,834,285
LUBRICATING DEVICE FOR CLUTCH PILOT BEARING
Filed Sept. 12, 1929
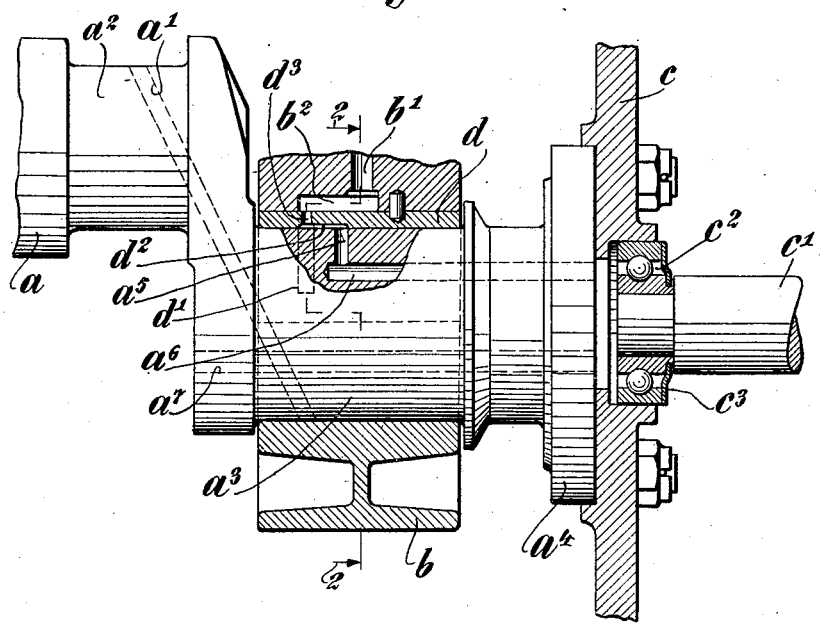
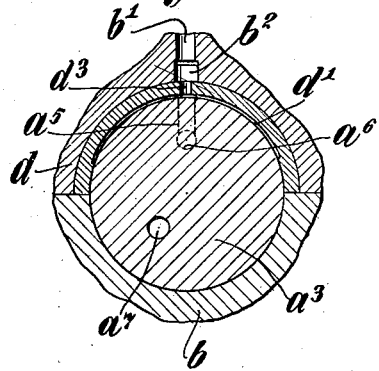
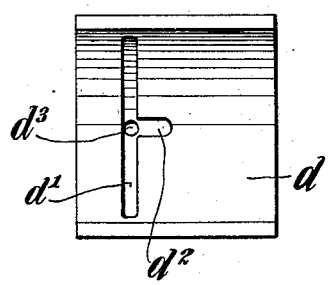
Inventor:
Bruno Loeffler,
By his Attorneys:
Redding, Greeley, O'Shea & Campbell Patented Dec. 1, 1931 1,834,285

UNITED STATES PATENT OFFICE

BRUNO LOEFFLER, OF PLAINFIELD, NEW JERSEY, ASSIGNOR TO INTERNATIONAL MOTOR COMPANY, OF NEW YORK, N. Y., A CORPORATION OF DELAWARE

LUBRICATING DEVICE FOR CLUTCH PILOT BEARING

Application filed September 12, 1929. Serial No. 392,079.

The present invention relates to lubricating systems and embodies, more specifically, an improved means for lubricating a clutch pilot bearing as used particularly in motor vehicle constructions.

The difficulty of lubricating, adequately, clutch pilot bearings has long been recognized and many systems for lubricating such bearings have been suggested without successfully solving the problem. Many of these systems have been make-shift in character and do not depend on a regular, or periodic supply of lubricant to the bearing. The present invention incorporates within the existing elements adjacent the clutch pilot bearing, a means for lubricating the same, in the embodiment shown, such means being incorporated to function simultaneously with the crank shaft lubricating means.

An object of the invention, therefore, is to provide a means for lubricating, effectively, the pilot bearing of a clutch.

A further object of the invention is to provide a means for regularly supplying a lubricant to a clutch pilot bearing and carrying away the used lubricant therefrom.

A further object of the invention is to incorporate in an existing lubricating means for the crank shaft, a means for lubricating, simultaneously, the clutch pilot bearing.

Further objects, not specifically enumerated above, will be apparent as the invention is described in greater detail in connection with the accompanying drawings, wherein:

Figure 1 is a view in section, taken through the rear main bearing of a crank shaft bearing and showing a portion of the crank shaft broken away and in section to illustrate the lubricating means of the present invention.

Figure 2 is a view in section, taken on line 2—2 of Figure 1, and looking in the direction of the arrows.

Figure 3 is a view in elevation, showing the oil groove in the crank shaft bearing of Figure 1.

Referring to the above drawings, $a$ designates a crank shaft which may have an oil duct $a'$ for lubricating the crank arms thereof. This oil duct may be drilled in the usual manner diagonally from the plane of a main bearing to the plane of the bearing $a^2$, as shown in Figure 1. The crank arm is formed with an end bearing $a^3$ which is journaled in a support $b$ carried by the engine. An extension $a^4$ serves as a means by which a clutch $c$ is secured to the crank shaft, a clutch shaft $c'$ being axially mounted with respect to the main bearing $a^3$ in a pilot bearing $c^2$. This pilot bearing is provided with an oil seal $c^3$ for preventing leakage of oil between the clutch.

An oil duct $b'$ is formed in the bearing support and carries a lubricant from a source of supply, such as a reservoir or pump, to a recess $b^2$ adjacent the bearing of the crank shaft. A grooved member $d$ is inserted within the bearing support $b$ and lies adjacent the main bearing $a^3$, extending circumferentially thereof for a distance which is substantially half that of the circumference. A groove $d'$, disposed radially of the axis of the bearing $a^3$, extends for a suitable distance around the inner periphery of the grooved member $d$. An offset longitudinal extension $d^2$ communicates with the groove $d'$ and a port $d^3$ provides a communication from the recess $b^2$ to the groove $d'$.

The main bearing $a^3$ is drilled radially at $a^5$ to communicate with the extension $d^2$, when aligned radially therewith, but offset with respect to the radial groove $d'$. A longitudinal duct $a^6$ communicates with the duct $a^5$ and extends outwardly to the end of the crank shaft, thus communicating with the pilot bearing $c^2$. A second longitudinal duct $a^7$, shown in dotted lines in Figure 1, communicates between the pilot bearing $c^2$ and the interior of the crank case to drain the used lubricant from the pilot bearing.

In operation, it will be seen that the crank shaft bearings are lubricated in the usual manner from circumferential duct or groove $d'$ through the ducts $a'$. Every revolution of the crank shaft causes the duct $a^5$ to communicate with the extension $d^2$ and thus supply lubricant from the circumferential duct $d'$ through the extension $d^2$ thereof, and ducts $a^5$ and $a^6$ to the pilot bearing. The used lubricant is drained into the crank case through the longitudinal duct $a^7$. In this manner, the pilot bearing is lubricated periodically and an adequate supply of lubricant to such bearing is therefore afforded.

While the invention has been described with specific reference to the accompanying drawings, it is not to be limited, save as defined in the appended claims.

What I claim is:

1. A lubricating device for a bearing comprising a shaft, a bearing support therefor, a relatively rotatable shaft, means to journal the second shaft in the first, coaxially therewith, means to seal the journal bearing, a supply of lubricant carried by the bearing support under pressure, a groove on the inner periphery of the bearing support, a longitudinal extension in the groove, a duct in the shaft communicating with the extension and the bearing, and a duct in the shaft communicating with the bearing to carry lubricant away therefrom.

2. A lubricating device for a bearing comprising a shaft, a bearing support therefor, an insert bushing carried by the bearing support, a relatively rotatably shaft, means to journal the second shaft in the first, coaxially therewith, means to seal the journal bearing, a supply of lubricant carried by the bearing support under pressure, a groove on the inner periphery of the bushing having a longitudinal extension, and a duct in the shaft communicating with the extension and the bearing.

This specification signed this 6th day of Sept., A. D. 1929.

BRUNO LOEFFLER.